United States Patent
Agrawal et al.

(10) Patent No.: US 8,832,375 B2
(45) Date of Patent: Sep. 9, 2014

(54) OBJECT TYPE AWARE BYTE CACHING

(75) Inventors: Dakshi Agrawal, Monsey, NY (US);
Thai V. Le, White Plains, NY (US);
Vasileios Pappas, Elmsford, NY (US);
Mudhakar Srivatsa, White Plains, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/479,689

(22) Filed: May 24, 2012

(65) Prior Publication Data
US 2014/0013057 A1    Jan. 9, 2014

(51) Int. Cl.
*G06F 12/08* (2006.01)
*H04N 5/00* (2011.01)
*H04L 29/06* (2006.01)

(52) U.S. Cl.
CPC .............. *G06F 12/0875* (2013.01); *H04N 5/00* (2013.01); *H04L 69/04* (2013.01)
USPC ................... 711/118; 711/216; 711/E12.025

(58) Field of Classification Search
USPC ................................. 711/118, 216, E12.025
See application file for complete search history.

(56) References Cited

U.S. PATENT DOCUMENTS

| | | | |
|---|---|---|---|
| 8,417,833 B1 * | 4/2013 | Amdahl | 709/247 |
| 2002/0032691 A1 | 3/2002 | Rabii et al. | |
| 2005/0235043 A1 | 10/2005 | Teodosiu et al. | |
| 2006/0015618 A1 * | 1/2006 | Freimuth et al. | 709/226 |
| 2007/0245090 A1 * | 10/2007 | King et al. | 711/129 |
| 2009/0271528 A1 | 10/2009 | Gurevich et al. | |
| 2010/0058467 A1 | 3/2010 | Ivory et al. | |
| 2011/0131298 A1 * | 6/2011 | Courtemanche et al. | 709/219 |
| 2013/0033994 A1 * | 2/2013 | Parekh et al. | 370/252 |
| 2013/0235931 A1 * | 9/2013 | Su et al. | 375/240.12 |

OTHER PUBLICATIONS

Ghemawat, S., et al., The Google File System, ACM SIGOPS Operating System Review, vol. 37, Issue 5, Dec. 2003.

Niu, F., et al., "Branch and Bound: A Paradigm of Elastic Network Caching," www.pages.cs.wisc.edu/-leenn/misc/branch-n-bound/pdf . . . 2010.

Kruus, E., et al., "Bimodal Content Defined Chunking for Backup Systems," (FAST'10) Proceedings of the 8th USENIX Conference on File and Storage Technologies, 2010.

Spring, N.T., et al., "A Protocol-Independent Technique for Eliminating Redundant Network Traffic," SIGCOMM '00, Stockholm, Sweden, Copyrigh 2000, ACM 1-58113-224-7/00/0008.

Anad, A., et al., "Redundancy in Network Traffic: Findings and Implications," SIGMETRICS/Performance '09, Jun. 15-19, Seattle, WA, Copyright 2009, ACM 978-1-60558-511-6/09/06.

\* cited by examiner

*Primary Examiner* — Hal Schnee
(74) *Attorney, Agent, or Firm* — Thomas Grzesik; Fleit Gibbons Gutman Bongini & Bianco PL

(57) ABSTRACT

One or more embodiments perform byte caching. At least one data packet is received from at least one network node. At least one data object is received from the at least one data packet. An object type associated with the at least one data object is identified. The at least one data object is divided into a plurality of byte sequences based on the object type that is associated with the at least one data object. At least one byte sequence in the plurality of byte sequences is stored into a byte cache.

23 Claims, 8 Drawing Sheets

OBJECT TYPE AWARE BYTE CACHING

This invention was made with Government support under Contract No.: W911NF-09-2-0053 awarded by U.S. Army. The Government has certain rights in this invention.

CROSS-REFERENCE TO RELATED APPLICATIONS

Cross-reference is made to the following application filed concurrently herewith: U.S. patent application Ser. No. 13/479,507, entitled BYTE CACHING WITH CHUNK SIZES BASED ON DATA TYPE, by Dakshi Agrawal, That V. Le, Vasileios Pappas, Mudhakar Srivatsa, and Dinesh Verma, the disclosure of which is incorporated herein by reference in its entirety.

BACKGROUND

Embodiments of the present invention generally relate to network data transmission, and more particularly relate to byte caching.

Congested links in a communication network generally degrade network performance, which results in poor quality user experience. One method of overcoming congestion is to utilize byte caching. Conventional byte caching techniques implement a byte cache at both ends of a network link. These byte caches allow for byte sequences to be stored therein so that only signatures that uniquely identify previously transmitted byte sequences need to be transmitted between end points. However, conventional byte caching techniques generally create bytes sequences based on the number of bytes and also create a signature for each of these sequences. Therefore, a large number of byte sequences and signatures are generated by these conventional systems, which require a large amount of computing resources.

BRIEF SUMMARY

In one embodiment, a method for performing byte caching is disclosed. The method comprises receiving at least one data packet from at least one network node. At least one data object is received from the at least one data packet. An object type associated with the at least one data object is identified. The at least one data object is divided into a plurality of byte sequences based on the object type that is associated with the at least one data object. At least one byte sequence in the plurality of byte sequences is stored into a byte cache.

In another embodiment, an information processing system for performing byte caching is disclosed. The information processing system comprises a memory and a processor that is communicatively coupled to the memory. A bye caching manager is communicatively coupled to the memory and the processor. The byte caching manager is configured to perform a method comprising receiving at least one data object from the at least one data packet. An object type associated with the at least one data object is identified. The at least one data object is divided into a plurality of byte sequences based on the object type that is associated with the at least one data object. At least one byte sequence in the plurality of byte sequences is stored into a byte cache.

In yet another embodiment, a computer program product tangibly embodying computer readable non-transitory instructions is disclosed. When the computer readable non-transitory instructions are implemented they cause a computer to carry out the steps of a method for performing byte caching. The method comprises receiving at least one data packet from at least one network node. At least one data object from the at least one data packet. An object type associated with the at least one data object is identified. The at least one data object is divided into a plurality of byte sequences based on the object type that is associated with the at least one data object. At least one byte sequence in the plurality of byte sequences is stored into a byte cache.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
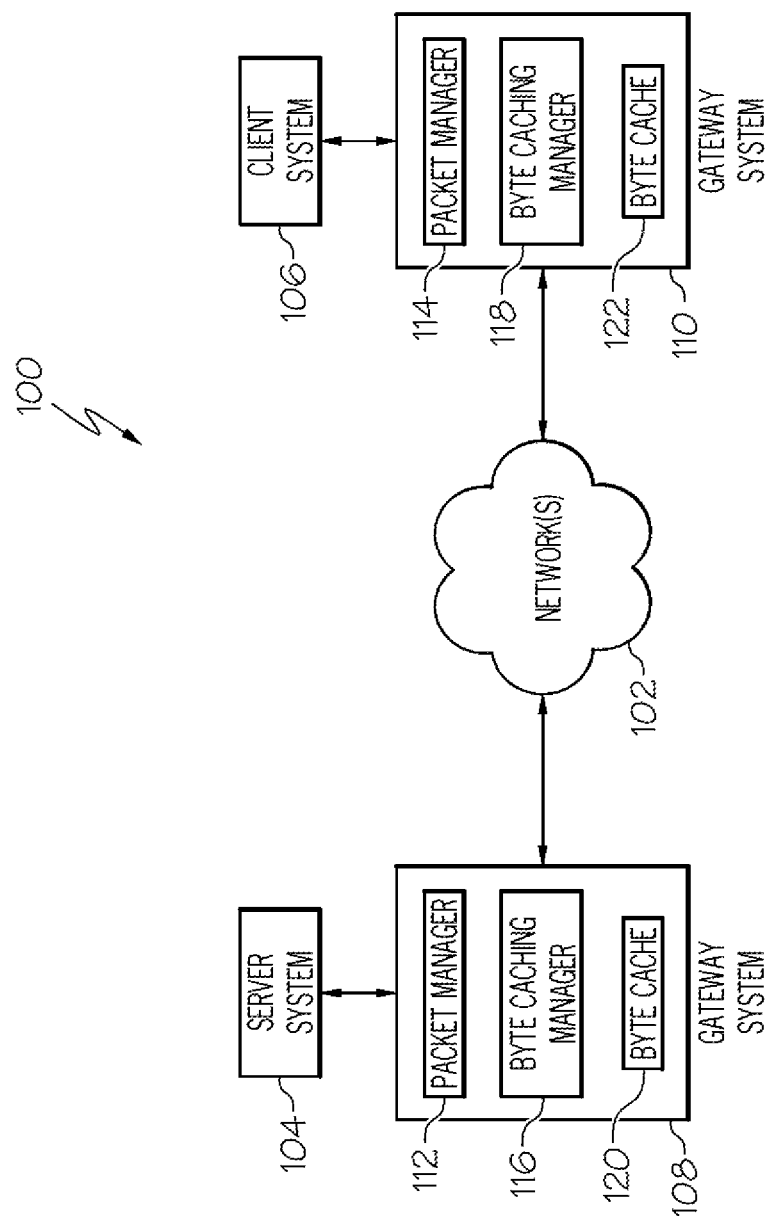
FIG. 1 is a block diagram illustrating one example of an operating environment according to one embodiment of the present invention.

FIG. 1 shows one example of an operating environment 100 according to one embodiment of the present invention. The operating environment 100 comprises one or more networks 102 that, in one embodiment, can include wide area networks, local area networks, wireless networks, and/or the like. The environment 100 also comprises a plurality of information processing systems 104, 106, 108, 110 that are communicatively coupled to the network(s) 102. The information processing systems include one or more server systems 104, one or more client systems 106, one or more server gateway systems 108, and one or more client gateway systems 110. The server system 104 is communicatively coupled to the server gateway system 108, while the client system 106 is communicatively coupled to the client gateway system 110. The gateway systems 108, 110 act as end-point nodes that couple each of the server and client systems 104, 106 to the network(s) 102. The server and client systems 104, 106 send data packets to their respective gateway system 108, 110 any time the data packets are destined for reception by a node outside of the client/server system's private network. These packets are then forwarded to their destination via the network 102 by the gateway systems 108, 110.

In one embodiment, each gateway system 108, 110 provides a byte caching environment. For example, each gateway system 108, 110 comprises a packet manager 112, 114, a byte caching manager 116, 118, and a byte cache 120, 122. The packet manager 112, 114 manages the reception and transmission of data packets at the gateway system 108, 110. The byte caching manager 116, 118 manages byte caching operations at the gateway system 108, 110. The byte cache 120, 122 is a memory cache or any other type of storage component that stores byte sequences of data objects within data packets and their signatures.

Figure 2:
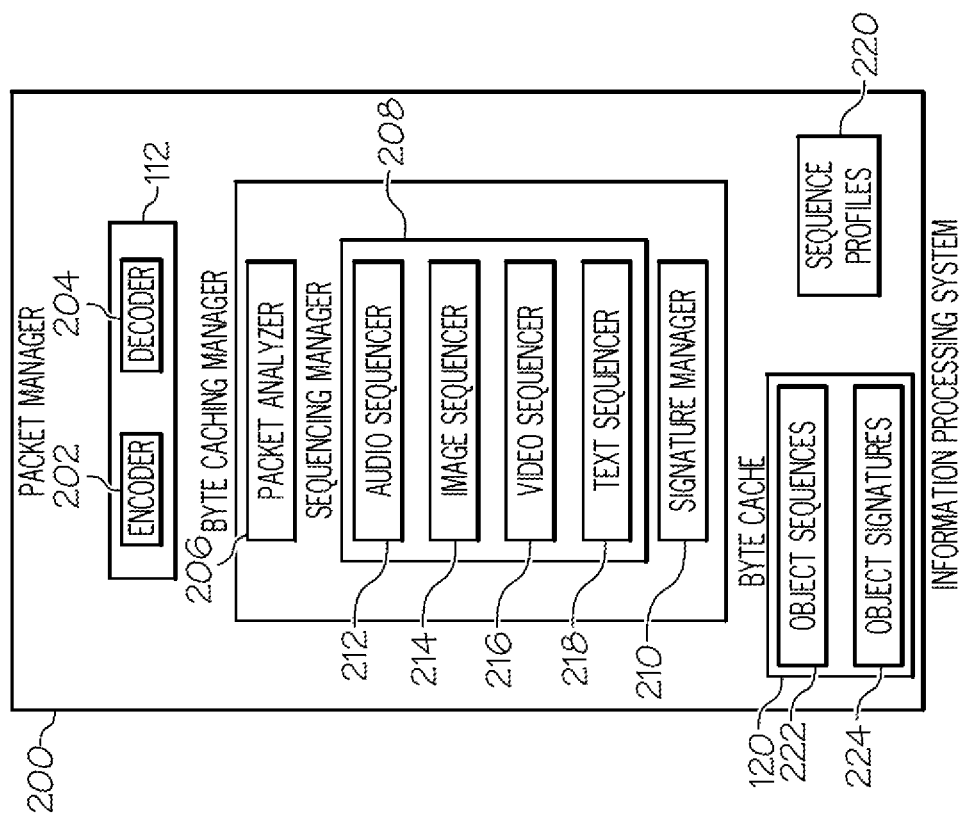
FIG. 2 is a block diagram illustrating a detailed view of an object type aware byte caching system according to one embodiment of the present invention.

FIG. 2 shows a more detailed view of a system 200 such as the server gateway system 108 or the client gateway system 110. It should be noted that embodiments of the present invention are not limited to gateway systems. Any type of information processing system that is capable of performing byte caching operations is applicable to embodiments of the present invention. In particular, FIG. 2 shows that, in one embodiment, the packet manager 112 comprises an encoder 202 and a decoder 204. The encoder 202 encodes data packets for transmission to a destination node. The decoder 204 decodes packets received by the gateway system 200 for processing thereof. It should be noted that packet manager 112 can also include any other hardware and/or software for receiving, sending, and managing data packets.

The byte caching manager 116, in one embodiment, comprises a packet analyzer 206, a sequencing manager 208, and a signature manager 210. The packet analyzer 206 extracts data objects from data packets received in a byte stream and analyzes the data objects to identify the type(s) of the data object(s). Examples of data object types are audio data objects, image data objects, video data object, and text data objects. A data packet can include multiple byte streams that include one or more of these data object types.

The sequencing manager 208 extracts the byte sequences for each data object of a given type identified by the packet analyzer 206 and identifies the type of data object therein. The sequencing manager 208 then utilizes one or more sequencing modules associated with the type of data object that has been identified to divide/partition the data object into a plurality of byte sequences 222 (also referred to as "chunks" or "object sequences"). Stated differently, a data object is divided into one or more byte sequences based on the object type of the data object being transmitted. For example, the sequencing manager 208, in one embodiment, comprises an audio sequencer 212, an image sequencer 214, a video sequencer 216, and a text sequencer 218. The sequencing manager 208 utilizes the audio sequencer 212 to sequence an audio data object. The image sequencer 214 is utilized to sequence an image data object. The video sequencer 216 is utilized to sequence a video data object. The text sequencer 218 is utilized to sequence a text data object. It should be noted that instead of using multiple sequencers a single sequencer can be utilized to perform various sequencing operations based on the type of data object of a data packet.

The following are examples of how each of the sequencers 212, 214, 216, and 218 can sequence a data object. It should be noted that embodiments of the present invention are not limited to these examples and other techniques/process for sequencing a data object are applicable as well. With respect to the audio sequencer 212, after receiving a specified number of bytes, the audio sequencer 212 computes one or more audio signatures. The audio sequencer 212 then searches for a match in a database. A match of the signature allows the audio sequencer 212 to identify the song track. If the audio sequencer 212 successfully finds a signature match, it then retrieves a copy of the song track and compares the stream of bytes received from the server, to the local copy of the song track. If the two match, the server system gateway 108 can instruct the client system gateway 110 to locally retrieve a copy of the song track, indicate the matching intervals to the client system gateway 110, and have the client system gateway 110 reconstruct the stream of bytes to be forwarded to the client system 106. If some bytes in the stream received from the server system 104 differ from that present in the local song track copy, the server system gateway 108 sends the differing bytes, and instructs the client system gateway 110 to reconstruct the stream of bytes appropriately before forwarding it to the client system 106.

With respect to the image sequencer 214, a JPEG (Joint Photographic Experts Group) image is one type of image file applicable to the image sequence 214. However, other types of images are applicable as well. A JPEG image includes a sequence of segments. Each segment starts with a marker that indicates the type of the segment. For example, a segment may include metadata including the size of the picture, the color depth, the image resolution, or the date image was created. Another type of segment serves to include text comments. After the marker, a segment may include the length of the segment payload. While the segment payload of certain types is in cleartext, others are encoded (e.g., the actual JPEG image is typically compressed). As such, the image sequencer 214 first parses the JPEG image to differentiate the different segments. Already encoded segments are simply forwarded to the client 106. In contrast, for each non-encoded segment, the image sequencer 214 searches for previously seen patterns of bytes, and replaces them with their signatures to reduce their sizes. The client system gateway reconstructs the segment payloads from the signatures before forwarding them to the client system 106.

With respect to the video sequencer 216, one type of video file applicable to the video sequencer 216 is an MPEG (Motion Picture Experts Group) video file. However, other video types are also applicable as well. The server gateway system 108 receives the stream of bytes from the server system 104, and stores them in a local buffer. The storage of received bytes in a temporary buffer allows the server gateway system 108 to process the bytes and to eliminate redundancy across the boundaries of data packets. In other words, sequences can expand across multiple packets. A byte sequence is not limited to bytes contained within one packet. A parser in the video sequencer 216 analyzes the buffer and searches for the start of a given picture frame (frame type) such as, but not limited to, I-frames. MPEG frames can be of different types (e.g., I, B, P). Each frame includes a header that indicates the frame type. A chunk (byte sequence) is defined by the sequence of bytes from the start of one I-frame to the start of the subsequent I-frame. Upon identifying a chunk, the chunk is removed from the buffer, and a signature is computed on the chunk. If the chunk was previously seen and is present in the cache, the chunk is replaced by its signature in the stream of bytes sent to the client system 106. If not present, the chunk and signature may be stored in the local cache. Not all chunks and signatures may be stored in the local cache for performance reasons. Instead, for example, only the chunks and signatures whose last one or more bits all equal to 0 may be stored.

With respect to the text sequence 218, the packet analyzer 206 can detect that the data object comprising text. For example, the data object can be an email comprising a plaintext paragraph followed by an attachment (e.g., Portable Document Format (PDF) file). In this example, the text sequence 218 parses the stream of bytes to detect the start of the plaintext paragraph, and the start of the attachment. The text sequence 218 then searches for redundancy in the cleartext portions while skipping the already compressed sections. For example, the plaintext paragraph is processed to detect and eliminate already seen patterns of bytes, while the attachment is directly forwarded to the client without further processing as a PDF file is already compressed.

Each of these sequencers 212, 214, 216, 218 perform their sequencing operations according to a set of sequencing profiles 220 to determine how to sequence the given data object. In one embodiment, the sequencing profiles 220 indicate how a data object is to be sequenced based on its data object type. These sequencing profiles 220 are updatable and can be stored separate from or within the sequencers 212, 214, 216, 218. In another embodiment, the sequences 212, 214, 216, 218 are hardcoded with sequencing instructions. The signature manager 210 calculates a signature or fingerprint 224 for each of object sequences 222 created by the sequences 212, 214, 216, 218. The signature/fingerprint 224 can be a hash value or any other data that can uniquely identify the object chunk. The byte cache 120 stores the object sequences 222 and/or the signatures 224 of the sequences 222.

Object Aware Byte Caching

Figure 3:
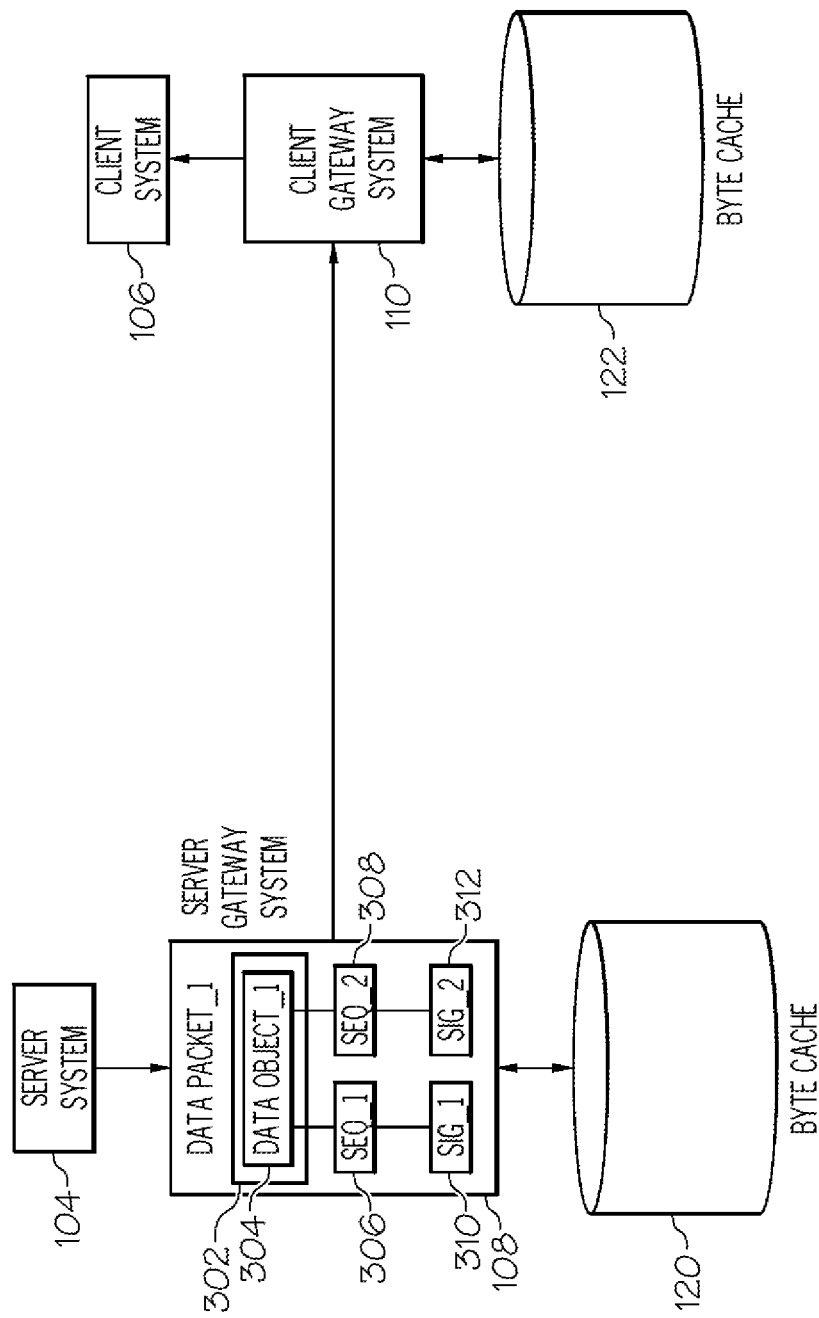
FIGS. 3-6 are transactional block diagrams illustrating one example of object type away byte caching according to one embodiment of the present invention.

As discussed above, the gateway systems 108, 110 provide a byte caching environment. In one embodiment, the byte caching managers 116, 118 of the systems 108, 110 perform object type aware byte caching as illustrated below. For example, FIG. 3 shows that the server gateway system 108 receives a data packet 302 (e.g., an internet protocol packet), DataPacket_1, from the server system 104 that is destined for reception by the client system 106. The packet manager 112 of the server gateway system 108 processes the packet 302 and passes its payload (i.e., packet data without any protocol headers) to the byte caching manager 116. The packet analyzer 206 of the byte caching manager 116 analyzes/inspects the payload to determine the object type of the data object(s) 304 within the payload. In one embodiment, the packet analyzer 206 analyzes various characteristics of the data object(s) 304 within the payload and/or packet headers (e.g., TCP/IP header, HTTP header, etc.)

Based on the analysis/inspection process the packet analyzer 206 can determine the object type of the data object(s) 304 within the received packet 302. For example, the packet analyzer 206 determines that the received data packet 302 comprises one or more audio, image, video, and/or text data objects. The following is one example of how the packet analyzer 206 can determine the object type associated with a data object. In order to retrieve content from a server system 104, a client system 106 can first establish a communication session with the server system 104. For example, the client system 106 can open a Transmission Control Protocol (TCP) connection with the server by sending it a TCP SYN message. Upon detecting the TCP SYN message, the client gateway system 110 replies with a TCP SYN ACK and completes the TCP handshake with the client system 106. At the same time, the client gateway system 110 initiates a TCP connection with the server system 104 by sending the server system 104 a TCP SYN through the server gateway system 108.

After the successful establishment of the TCP connection, the client system 106 has a communication session with the server system 104 and can send the request for the content to the server system 104. For example, the request message may be a HTTP (Hypertext Transfer Protocol) Request. In this instance, the request message comprises a request line, e.g., GET/images/picture123.png HTTP/1.1, which specifies the object (picture123.png) the client system 106 wants to download from the server system 104. From the file extension (e.g., png), both the client gateway system 110 and server gateway system 108 can identify the type (e.g., image) of the object. Other protocols including SMTP (Simple Mail Transfer Protocol), RTP (Real-time Transfer Protocol), and SIP (Session Initiations Protocol) also have a content type field (also called a Multipurpose Internet Mail Extensions (MIME) Type), whose value serves to identify the type of the object (e.g., text/html, image/jpeg, etc.). All subsequent IP packets sent from the server system 104 are processed by the sequencer 212, 214, 216, 218 associated with the identified object type of the data object (e.g., image sequencer 214). As an object may be fragmented and sent over multiple IP packets, after detection of the object type (e.g., from the HTTP header), the 4 tuple (Source IP address, Destination IP address, Transport Protocol, Source Port Number, Destination Port Number) of each IP data packet identifies a flow, and all data packets corresponding to that flow are processed by the appropriate sequencer 212, 214, 216, 218, until termination of the TCP connection. It should be noted that sequences can be performed across multiple packets (e.g., a stored byte sequence is not limited to bytes within a single packet).

Once the object type of the data object 304 within the packet 302 is identified the sequencing manager 208 selects the appropriate sequencing module for performing one or more sequencing operations on the data object 304, as discussed above. In the current example the data object 304 is an image data object. Therefore the sequencing manager 208 selects the image sequencer 214 to perform sequencing operations on the data object 304 that are specific to image data object types. As discussed above, these object type specific operations can be identified within the sequencing profiles 220 and/or hardcoded into the sequencers. The image sequencer 214 then divides/partitions the data object 304 into a plurality of byte sequences 306, 308 (e.g., sections/chunks).

Sequencing data object based on its object type allows for much larger byte sequences to be created than conventional byte caching techniques. This allows for less signatures/fingerprints to be generated, thereby saving valuable computing resources. For example, conventional byte caching methods generally utilize a sliding window to select all possible byte sequences of a given length for a data packet. If a data packet comprises 8000 bytes, conventional byte caching methods usually divide the data packet into 8000 byte sequences and calculate a signature for each of these sequences. Therefore, most conventional byte caching systems would create 8000 signatures in this example. However, because the byte caching manager 116 of one or more embodiments create byte sequences based on the object the data object within the data packet, the byte caching manager 116 can create much larger sequences based on the structure of the data object. This allows the byte caching manager 116 to create a much smaller number of byte sequences and signatures. For example, the imaging sequencer 214 can be configured to sequence an image object type into two byte sequences of equal length. Therefore, if the data object is composed of 8000 bytes the imaging sequencer 214 sequences the data object into two byte sequences each having a length of 4000 bytes. Therefore, since the data object is divided into two parts only two signatures are required as compared to the 8000 with conventional systems.

Once the sequencer 214 has divided/separated the data object into a plurality of byte sequences 306, 308, the signature manager 210 calculates a signature/fingerprint 310, 312 for each of the byte sequences. As discussed above, a signature/fingerprint can be a hash value or any other data that can uniquely identify the object chunk. The byte caching manager 116 then compares the byte sequences 306, 308 to byte sequences stored in the byte cache 120 to determine if these byte sequences have been previously received and transmitted to the client system gateway 110. If a match exists this indicates that these byte sequences have been previously received and transmitted to the client system gateway 110. A match also indicates that the byte sequences 306, 308 are stored within the byte cache 122 of the client system gateway 110 since it is part of the same byte caching environment as the server system gateway 108. If the byte cache 120 at the server gateway system 108 does not comprise the byte sequences 306, 308 this indicates that these byte sequences have not been previously received by the sever system gateway 108.

Figure 4:
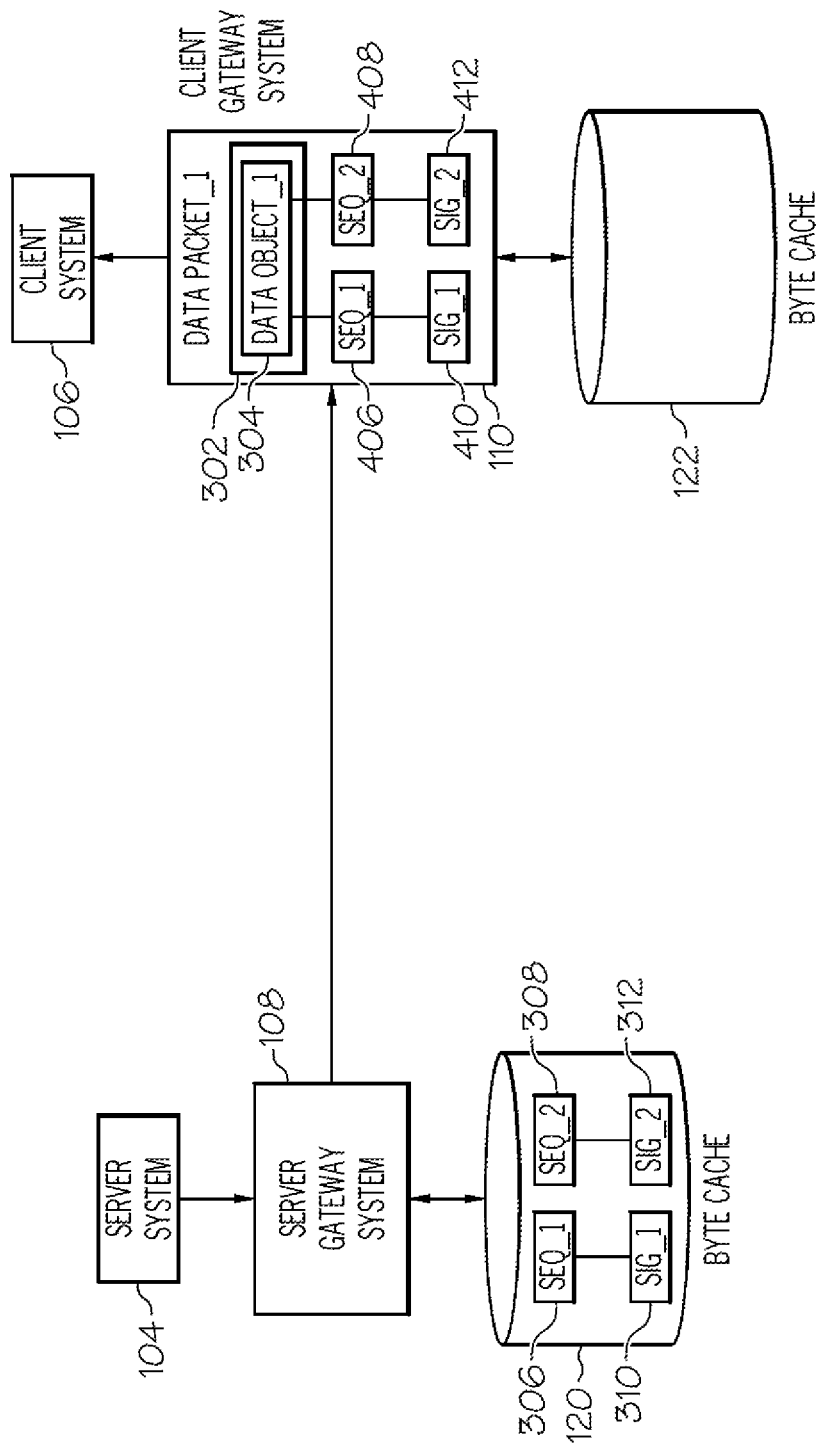

In the example of FIG. 3, the byte caching manager 116 does not identify the byte sequences 306, 308, in the cache 120. Therefore, the byte caching manager 116 determines that these byte sequences have not been previously received and transmitted to the client gateway system 110. The byte caching manager 116 stores the byte sequences 306, 308 and their signatures 310, 312 within the byte cache 120 as shown in FIG. 4. In an alternative embodiment, only the signatures 310, 312 are stored within the byte cache 120. The package manager 112 of the server gateway system 108 then transmits datapacket_1 302 to the client gateway system 110 as shown in FIG. 4. In one embodiment, the byte caching manager 118 of the client gateway system 110 analyzes the data packet 302 to determine if the packet 302 comprises any byte sequence signatures. If so, then the byte caching manager 118 extracts these signatures for data object reconstruction, in a known manner. The byte caching manager 118 then performs a similar process as that performed by the server gateway system 108 discussed above with respect to FIG. 3.

Figure 5:
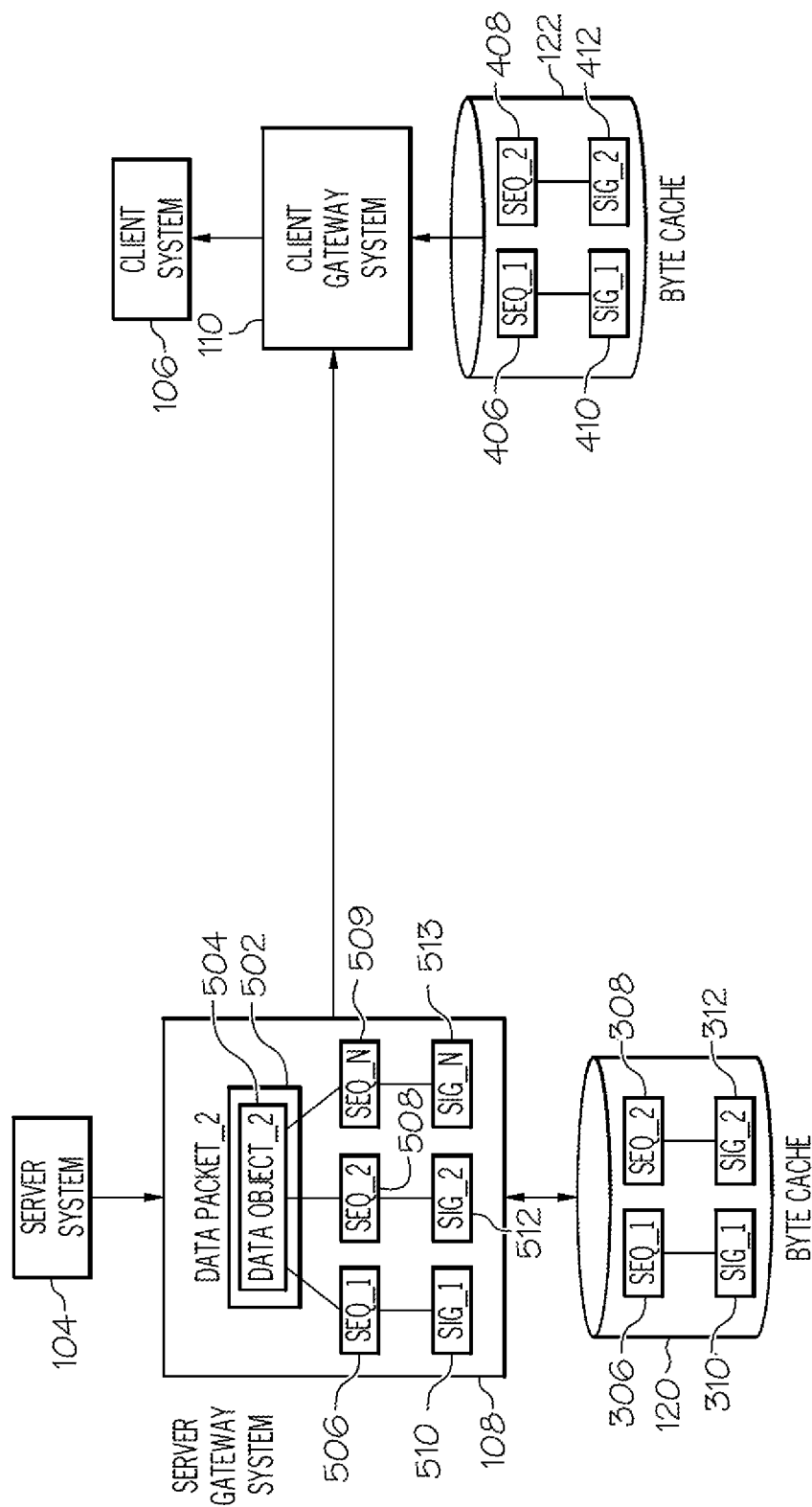

For example, the byte caching manager 118 of the client gateway system 110 analyzes/inspects the payload of the packet 302 to determine the object type of the data object(s) 304 within the payload. Based on the identified object type the byte caching manager 118 performs one or more sequencing operations, which are specific to the identified object type, on the data object 304. This results in the data object 304 being partitioned into a plurality of byte sequences 406, 408 (which are the same as byte sequences 306, 308). The byte caching manager 118 also calculates a signature 410, 412 for each of these byte sequences 406, 408, as discussed above. The byte caching manager 118 then stores the byte sequences 406, 408 and signatures 410, 412 in the byte cache 122, as shown in FIG. 5, and sends the data packet 302 to client system 106. It should be noted that, in one embodiment, the server gateway system 108 can transmit the byte sequences and their signatures within the data packet so that the byte caching manager 118 does not have to create them. In this embodiment, the byte caching manager 118 analyzes the byte cache 122 to determine if it includes any matching byte sequences and/or signatures.

FIG. 5 shows that the gateway server system 108 has received another data packet 502, DataPacket_2, from the server system 106. In response to receiving this data packet 502 the byte caching manager 116 performs a similar process to that discussed above with respect to FIG. 3. For example, the byte caching manager 116 analyzes/inspects the payload of the packet 502 to determine the object type of the data object(s) 504 within the payload. Based on the identified object type the byte caching manager 116 performs one or more sequencing operations, which are specific to the identified object type, on the data object 504. This results in the data object 504 being partitioned into a plurality of byte sequences 506, 508, 509. The byte caching manager 116 also calculates a signature 510, 512, 513 for each of these byte sequences 506, 508, 509 as discussed above.

The byte caching manager 116 then compares the byte sequences 506, 508, 509 and/or the signatures 510, 512, 513 to the sequences and/or signatures within the byte cache 120, as discussed above. In the example shown in FIG. 5 the byte caching manager 116 determines that a match (Seq_1 306) for byte sequence Seq_1 506 byte sequence and a match (Seq_2 308) for Seq_2 exist within the byte cache 120. The byte caching manager 116 also determines that a match does not exist within the byte cache 120 for Seq_N 509. The byte caching manager 116 stores byte sequence Seq_N 509 and its signature Sig_N 513 within the byte cache 120. The byte caching manager 116 encodes the data packet 502 with the signatures Sig_1 310 and Sig_2 312 for sequence Seq_1 506 and Seq_2 508 along with the byte sequence Seq_N 509. It should be noted that Sig_1 310 is the same as Sig_510 and Sig_2 312 is the same as Sig_512.

Figure 6:
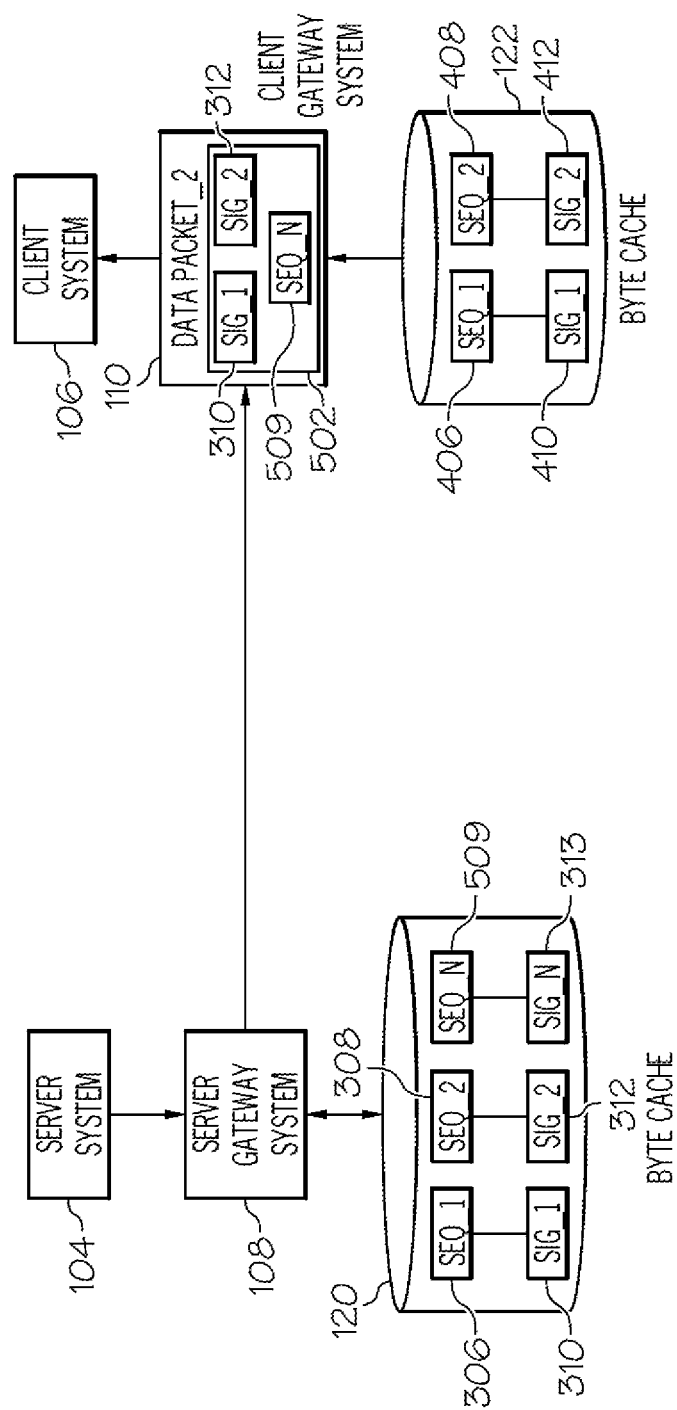

This encoded data packet 502 is then sent to the client gateway system 110, as shown in FIG. 6. In other words, because the server gateway system 108 and client gateway system 110 have previously received DataObject_1 304, the server gateway system 108 only needs to send the signatures associated with byte sequences of DataObject_1. The byte cache 122 of the client gateway system 110 already comprises the byte sequences 406, 408 corresponding to DataObject_1 304. The byte sequence Seq_N 509 is sent to the client gateway system 110 since the byte cache 122 of the byte caching manager 116 does not comprise a corresponding byte sequence.

The client gateway system 110 receives the data packet 502 as shown in FIG. 6 and performs a process similar to that discussed above with respect to FIGS. 3 and 4. For example, the byte caching manager 118 of the client gateway system 110 extracts the signatures Sig_1 310 and Sig_2 312 from the packet 502. The byte caching manager 118 utilizes these signatures to find the corresponding byte sequences Seq_1 406 and Seq_2 408 within the byte cache 122. The byte caching manager 118 also generates the byte sequence and signature for byte sequence Seq_N 509 that is within the packet 502. This byte sequence and signature are then stored within the byte cache 122. The client gateway system 110 then reconstructs the packet using the retrieved byte sequences along with the byte sequence that was within the packet and sends the reconstructed packet to the client system 106.

Figure 7:
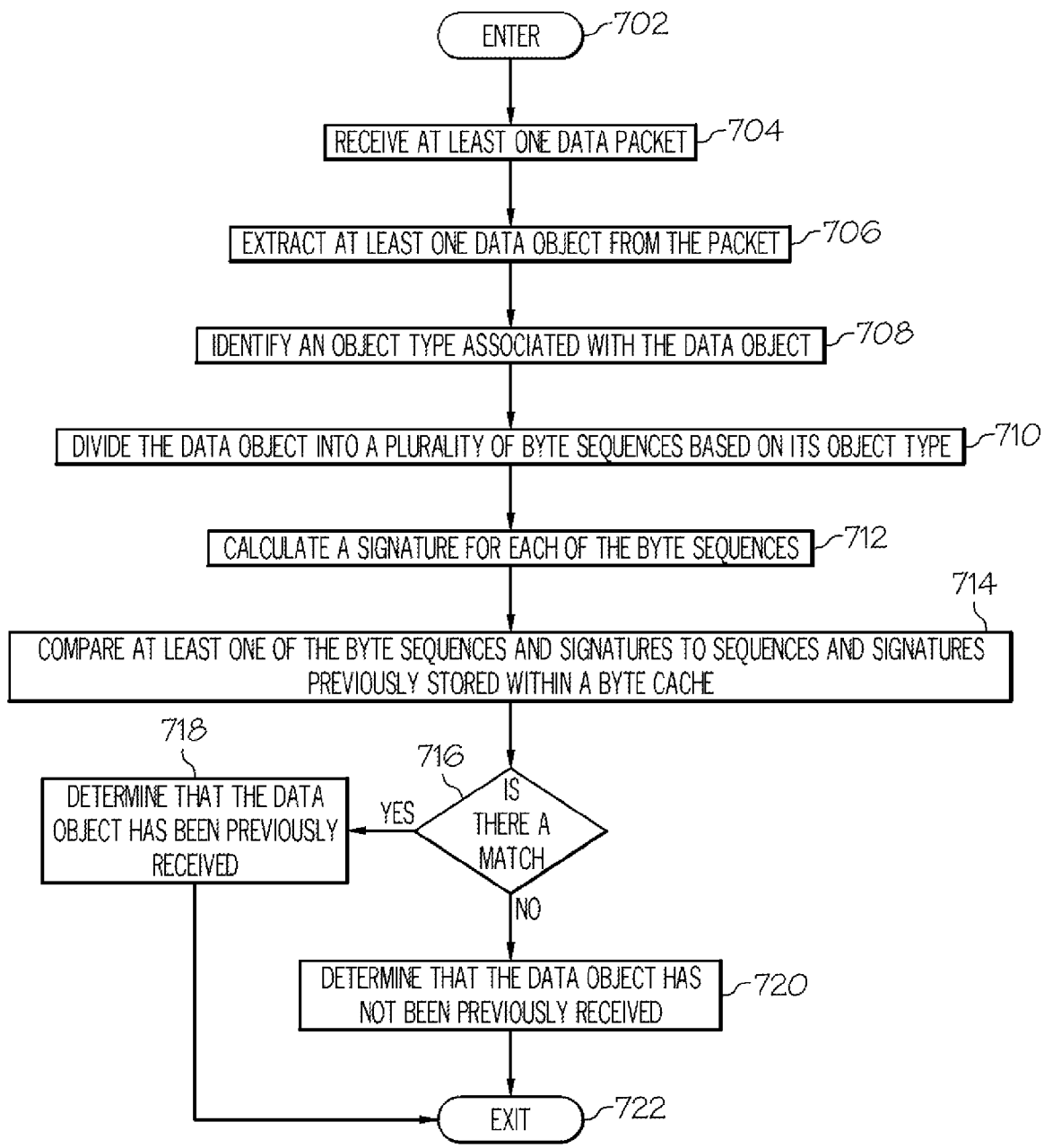
FIG. 7 is an operational flow diagram illustrating one example of an overall process for object type away byte caching according to one embodiment of the present invention.

FIG. 7 shows an operational flow diagram illustrating one example of byte caching. It should be noted that the steps of the operation flow diagram shown in FIG. 7 have already been discussed above in greater detail. The operational flow diagram of FIG. 7 begins at step 702 and flows directly to step 704. The byte caching manager 116, at step 704, receives at least one data packet. The byte caching manager 116, at step 706, extracts at least one data object from the packet. The byte caching manager 116, at step 708, identifies an object type associated with the data object.

The byte caching manager 116, at step 710, divides the data object into a plurality of byte sequences based on its object type. The byte caching manager 116, at step 712, calculates a signature for each of the byte sequences. The byte caching manager 116, at step 714, compares at least one of the byte sequences and signatures to sequences and signatures that have been previously stored within a byte cache 120. The byte caching manager 116, at step 716, determines if there is a match. If so, the byte caching manager 116, at step 718, determines that the data object has been previously received and does not store the sequences/signatures within the byte cache 116. When sending the packet to its destination the byte caching manager 116 only places the signatures of the byte sequences within the data packet as compared to the byte sequences themselves, as discussed above. The control flow then exits at step 722. If a match does not exist, the byte caching manager 116, at step 720, determines that the data object has not been previously received and does stores the sequences/signatures within the byte cache 116. When sending the packet to its destination the byte caching manager 116 places the byte sequences within the data packet, as discussed above. The control flow then exits at step 722.

Figure 8:
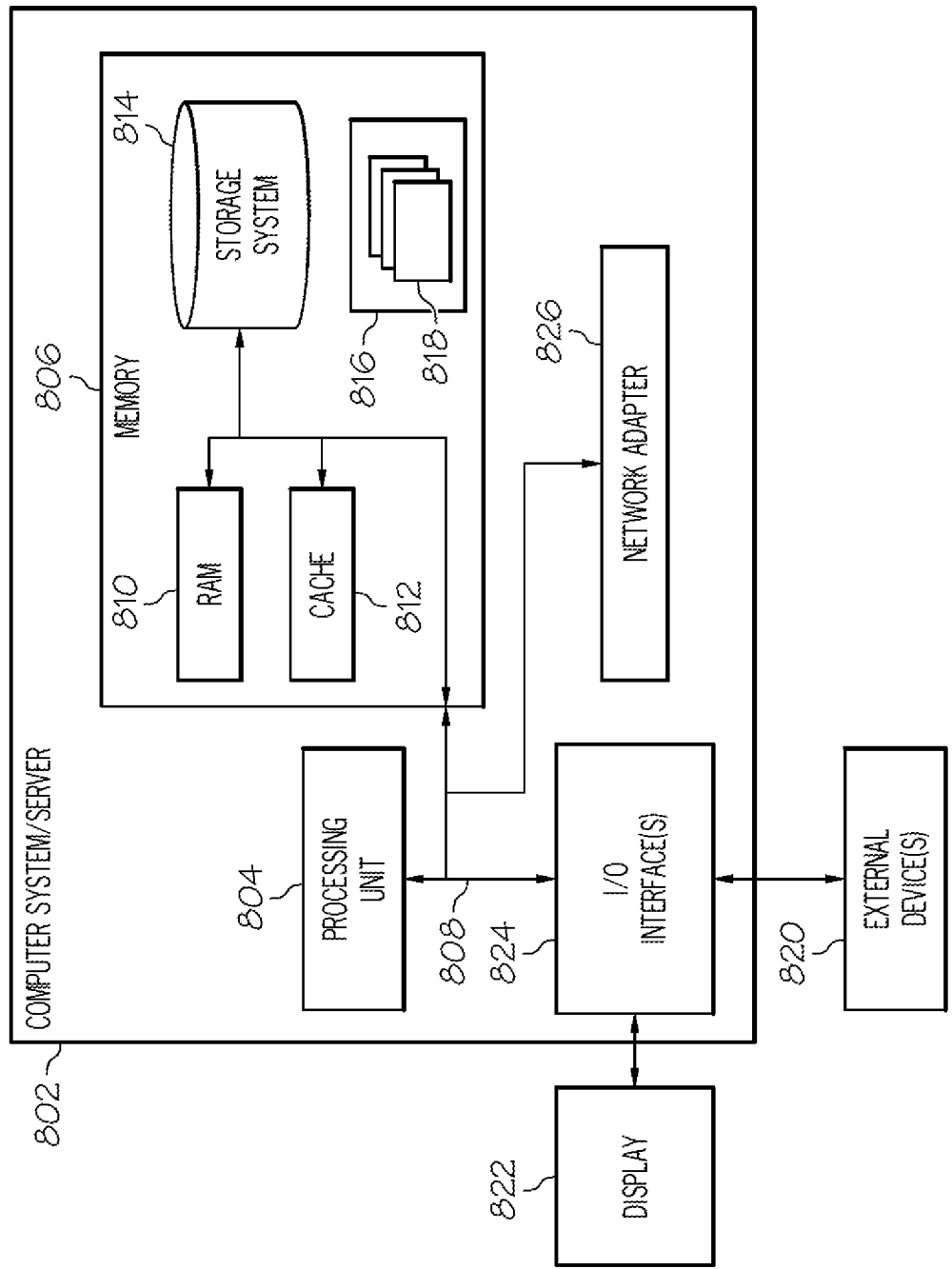
FIG. 8 illustrates one example of an information processing system according to one embodiment of the present invention.

Referring now to FIG. 8, a schematic of an example of an information processing system, such as the gateway systems 108, 110 of FIG. 1, is shown. Information processing system 802 is only one example of a suitable system and is not intended to suggest any limitation as to the scope of use or functionality of embodiments of the invention described herein. Regardless, the information processing system 802 is capable of being implemented and/or performing any of the functionality set forth hereinabove.

The information processing system 802 can be a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 8, the information processing system 802 is shown in the form of a general-purpose computing device. The components of the information processing system 802 can include, but are not limited to, one or more processors or processing units 804, a system memory 806, and a bus 808 that couples various system components including the system memory 806 to the processor 804.

The bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 802 typically includes a variety of computer system readable media. Such media may be any available media that is accessible by the information processing system 802, and it includes both volatile and non-volatile media, removable and non-removable media.

Although not shown, the system memory 806, in one embodiment, comprises the packet manager 112, the byte caching manager 116, the byte cache 120, and the sequencing profiles 220, as shown in FIG. 2. These one or more components can also be implemented in hardware as well. The system memory 806 can include computer system readable media in the form of volatile memory, such as random access memory (RAM) 1010 and/or cache memory 812. The information processing system 802 can further include other removable/non-removable, volatile/non-volatile computer system storage media. By way of example only, a storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. As will be further depicted and described below, the memory 806 may include at least one program product having a set (e.g., at least one) of program modules that are configured to carry out the functions of various embodiments of the invention.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the invention as described herein.

The information processing system 802 can also communicate with one or more external devices 820 such as a keyboard, a pointing device, a display 822, etc.; one or more devices that enable a user to interact with the information processing system 802; and/or any devices (e.g., network card, modem, etc.) that enable computer system/server 802 to communicate with one or more other computing devices. Such communication can occur via I/O interfaces 824. Still yet, the information processing system 802 can communicate with one or more networks such as a local area network (LAN), a general wide area network (WAN), and/or a public network (e.g., the Internet) via network adapter 826. As depicted, the network adapter 826 communicates with the other components of information processing system 802 via the bus 808. It should be understood that although not shown, other hardware and/or software components could be used in conjunction with the information processing system 802. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing byte caching, the method comprising:
   receiving at least one data packet from at least one network node;
   extracting at least one data object from the at least one data packet;
   identifying an object type associated with the at least one data object;
   selecting at least one sequencing profile from a plurality of sequencing profiles based on the object type that has been identified;
   dividing the at least one data object into a plurality of byte sequences based on the sequencing profile that has been selected; and
   storing at least one byte sequence in the plurality of byte sequences into a byte cache.

2. The method of claim 1, further comprising:
   calculating a signature for each byte sequence in the plurality of byte sequences; and
   storing at least one of the signatures in the byte cache.

3. The method of claim 1, wherein storing at least one of the plurality of byte sequences into the byte cache comprises:
   comparing the plurality of byte sequences to one or more byte sequences previously stored within the byte cache; and
   responsive to the one or more byte sequences failing to match the at least one byte sequence, storing the at least one byte sequence in the byte cache.

4. The method of claim 3, wherein comparing the plurality of byte sequences to one or more byte sequences previously stored within the byte cache comprises:
   comparing, for each byte sequence in the plurality of byte sequences, a signature associated with the byte sequence to one or more signatures previously stored within the byte cache.

5. The method of claim 1, further comprising:
   determining that the byte cache comprises at least one other byte sequence in the plurality of byte sequences, wherein the at least one other byte sequence has been previously stored within the byte cache; and
   sending, in response to the determining, a data packet to at least one networking node comprising
   a signature representing the at least one other byte sequence, and
   each remaining byte sequence in the plurality of byte sequences.

6. The method of claim 1, wherein the object type is a video object type.

7. The method of claim 1, wherein the object type is one of:
an image object type;
an audio object type; and
a text object type.

8. The method of claim 1, wherein the object type is determined to be an image object type, and wherein dividing the at least one data object comprises:
dividing the at least one data object into byte sequences of equal length.

9. The method of claim 1, wherein the object type is determined to be a video object type, and wherein dividing the at least one data object comprises:
dividing the at least one data object into byte sequences at boundaries between each picture frame of a given frame type of the at least one data object.

10. An information processing system for performing byte caching, the information processing system comprising:
a memory;
a processor communicatively coupled to the memory; and
a byte caching manager communicatively coupled to the processor and the memory, wherein the byte caching manager is configured to perform a method comprising:
receiving at least one data packet from at least one network node;
extracting at least one data object from the at least one data packet;
identifying an object type associated with the at least one data object;
dividing the at least one data object into a plurality of byte sequences based on the object type that is associated with the at least one data object, wherein the dividing comprises:
determining, based on the identifying, if the object type is a video object type;
based on the object type being a video object type, dividing the at least one data object into byte sequences at boundaries between each picture frame of a given frame type of the at least one data object; and
storing at least one byte sequence in the plurality of byte sequences into a byte cache.

11. The information processing system of claim 10, wherein the method further comprises:
calculating a signature for each byte sequence in the plurality of byte sequences; and
storing at least one of the signatures in the byte cache.

12. The information processing system of claim 10, wherein storing at least one of the plurality of byte sequences into the byte cache comprises:
comparing the plurality of byte sequences to one or more byte sequences previously stored within the byte cache; and
responsive to the one or more byte sequences failing to match the at least one byte sequence, storing the at least one byte sequence in the byte cache.

13. The information processing system of claim 12, wherein comparing the plurality of byte sequences to one or more byte sequences previously stored within the byte cache comprises:
comparing, for each byte sequence in the plurality of byte sequences, a signature associated with the byte sequence to one or more signatures previously stored within the byte cache.

14. The information processing system of claim 10, wherein the method further comprises:
determining that the byte cache comprises at least one other byte sequence in the plurality of byte sequences, wherein the at least one other byte sequence has been previously stored within the byte cache; and
sending, in response to the determining, a data packet to at least one networking node comprising
a signature representing the at least one other byte sequence, and
each remaining byte sequence in the plurality of byte sequences.

15. The information processing system of claim 10, wherein the object type is one of:
an image object type;
an audio object type; and
a text object type.

16. A computer program product tangibly embodying computer readable non-transitory instructions which, when implemented, cause a computer to carry out the steps of a method for performing byte caching, the method comprising:
receiving at least one data packet from at least one network node;
extracting at least one data object from the at least one data packet;
identifying an object type associated with the at least one data object;
selecting at least one sequencing profile from a plurality of sequencing profiles based on the object type that has been identified;
dividing the at least one data object into a plurality of byte sequences based on the sequencing profile that has been selected; and
storing at least one byte sequence in the plurality of byte sequences into a byte cache.

17. The computer program product of claim 16, wherein the method further comprises:
calculating a signature for each byte sequence in the plurality of byte sequences; and
storing at least one of the signatures in the byte cache.

18. The computer program product of claim 16, wherein storing at least one of the plurality of byte sequences into the byte cache comprises:
comparing the plurality of byte sequences to one or more byte sequences previously stored within the byte cache; and
responsive to the one or more byte sequences failing to match the at least one byte sequence, storing the at least one byte sequence in the byte cache.

19. The computer program product of claim 18, wherein comparing the plurality of byte sequences to one or more byte sequences previously stored within the byte cache comprises:
comparing, for each byte sequence in the plurality of byte sequences, a signature associated with the byte sequence to one or more signatures previously stored within the byte cache.

20. The computer program product of claim 16, wherein the method further comprises:
determining that the byte cache comprises at least one other byte sequence in the plurality of byte sequences, wherein the at least one other byte sequence has been previously stored within the byte cache; and
sending, in response to the determining, a data packet to at least one networking node comprising
a signature representing the at least one other byte sequence, and
each remaining byte sequence in the plurality of byte sequences.

21. The computer program product of claim 16, wherein the object type is a video object type.

22. The computer program product of claim 16, wherein the object type is one of:
   an image object type;
   an audio object type; and
   a text object type.

23. The computer program product of claim 16, wherein the object type is determined to be a video object type, and wherein dividing the at least one data object comprises:
   dividing the at least one data object into byte sequences at boundaries between each picture frame of a given frame type of the at least one data object.

* * * * *